United States Patent [19]

Metzner et al.

[11] 4,396,198
[45] Aug. 2, 1983

[54] JOINT PIN SEAL FOR A CATERPILLAR TRACK

[75] Inventors: Hermann Metzner, Mörlenbach; Erich Habel, Fürth; Karl Hoff, Monchen-Gladbach; Herbert Schümacher, Gorxheimertal, all of Fed. Rep. of Germany

[73] Assignee: Firma Carl Freudenberg, Weinheim, Fed. Rep. of Germany

[21] Appl. No.: 405,729

[22] Filed: Aug. 6, 1982

[30] Foreign Application Priority Data

Nov. 21, 1981 [DE] Fed. Rep. of Germany ....... 3146175

[51] Int. Cl.³ .......................... F16J 15/32; F16J 15/34
[52] U.S. Cl. ........................................ 277/84; 277/92; 277/95; 305/11
[58] Field of Search ................. 277/81 R, 84, 88, 92, 277/95, 152; 305/11-13

[56] References Cited

U.S. PATENT DOCUMENTS

| 3,275,334 | 9/1966 | Voitik | 277/84 X |
| 3,336,086 | 8/1967 | Reinsma | 277/95 X |
| 3,664,675 | 5/1972 | Malmstrom | 277/84 |
| 4,062,550 | 12/1977 | Satsumabayashi et al. | 277/92 |
| 4,240,642 | 12/1980 | Roussin | 277/84 |
| 4,248,439 | 2/1981 | Hoslett | 305/11 X |
| 4,274,682 | 6/1981 | Livesay | 305/11 |

Primary Examiner—Robert S. Ward, Jr.
Attorney, Agent, or Firm—Kenyon & Kenyon

[57] ABSTRACT

A joint pin seal for a caterpillar track. The join pin seal comprises a support ring of hard elastomer material having a cylindrical inner wall. The support ring is firmly pressed in a housing bore which is adjacent a relatively movable machine part to be sealed. The support ring comprises a stiffening ring contacting the rear wall of the housing bore and a lip ring adjacent the machine part to be sealed. The lip ring has a sealing lip which presses against the surface of the machine part to be sealed. The stiffening ring is tapered in notch-like fashion into said lip ring forming a membrane at the transition into the lip ring and provides the support ring with a notch between the lip ring and the stiffening ring. A pressure ring, formed from a softer elastomer material, is disposed within the notch and contacts the housing bore wall. The pressure ring presses the sealing lip into the relatively movable machine part to be sealed. The ratio of the average radial distance from the membrane to the sealing lip to the average radial distance from the center line of the pressure ring area contacting the lip ring to the sealing lip is about 0.7 to 1.4.

8 Claims, 1 Drawing Figure

4,396,198

JOINT PIN SEAL FOR A CATERPILLAR TRACK

FIELD OF THE INVENTION

The invention relates to a joint pin seal for a caterpillar track.

BACKGROUND OF THE INVENTION

The joint pins of the caterpillar tracks of overland vehicles are, in general, oil-lubricated and ordinarily connect individual track members which typically may be steel castings. The relative motion of the parts sliding on each other comprises a swinging motion with low peak velocities between extended interruptions. The greatest stresses on joint pin seals employed in caterpillar tracks result from the wear-related, considerable axial play of the individual track links which is related to stresses due to soils of greatly varying consistency.

Prior art caterpillar track joint pin seals are discussed, for example, in U.S. Pat. No. 3,336,086 and the references cited therein. The support ring of the joint pin seals is deformable throughout to compensate for the axial play. Prior art joint pin seals have the disadvantage that the position of the sealing lip can be shifted a considerable distance outward in the radial direction in the event of axial compression. The consequence of this shifting is increased wear and the penetration of dirt particles into the area of the seal. The process is further amplified by reduction of the compression forces due to the occurrence of relaxation phenomena. Prior art joint pin seals thus required replacement at short intervals.

OBJECT OF THE INVENTION

It is therefore an object of the present invention to provide a joint pin seal for a caterpillar track wherein radial shifting of the sealing lip is substantially reduced.

It is another object of the invention to describe a joint pin seal for a caterpillar track which ensures a high-quality seal largely independent of the occurrence of relaxation phenomena of the rubber-elastic materials used.

These and other objects will become apparent from the following description and claims in conjunction with the drawing.

SUMMARY OF THE INVENTION

The present invention may be generally described as a joint pin seal for a caterpillar track for providing a seal with a relatively movable machine part that surrounds said joint pin and has a surface to be sealed which lies substantially in a plane defined by a radius from the axis of said joint pin, said seal comprising:
- a housing adjacent said movable machine part having a bore for receiving said joint pin wherein said housing bore defines a substantially cylindrical inner housing wall and a housing rear wall section facing said movable machine part;
- a support ring fabricated from a harder elastomer material comprising a stiffening ring and a lip ring with said support ring having a substantially constant inside diameter defining a substantially cylindrical inside wall and a variable outside diameter defining an outside wall; wherein
- said support ring is pressed firmly into said housing bore with said stiffening ring resting against said housing bore rear wall section and with said lip ring located adjacent said movable machine part surface to be sealed;
- said lip ring extends radially outward and has formed on a surface facing said movable machine part surface to be sealed a circumferential sealing lip projecting toward and sealingly contacting said movable machine part surface to be sealed; and
- said support ring outside wall is tapered in a notch-like fashion from said stiffening ring into said lip ring forming a membrane at the transition into said lip ring thereby providing said support ring with a notch between said stiffening ring and said lip ring;
- a pressure ring fabricated from a softer elastomer material disposed in said notch and having an outer circumferential wall surface in contact with said cylindrical inner housing wall, a front face surface in contact with said lip ring and a rear face surface in contact with said stiffening ring whereby said pressure ring presses said sealing lip against said movable machine part surface to be sealed;
- wherein the ratio of the average radial spacing of said membrane from said sealing lip to the average radial distance from the center line of said pressure ring front face surface area in contact with said lip ring to said sealing lip is about 0.7 to 1.4; and
- wherein the dimensions and the elasticity of the support ring are matched to the corresponding values of the pressure ring in such a manner that the axial distance between the movable machine part surface to be sealed and the housing rear wall section can be reduced without appreciable radial displacement of the sealing lip.

BRIEF DESCRIPTION OF THE DRAWING

In the drawing forming a part hereof and which comprises a single FIGURE.

DESCRIPTION OF THE PREFERRED EMBODIMENT

Figure 1:
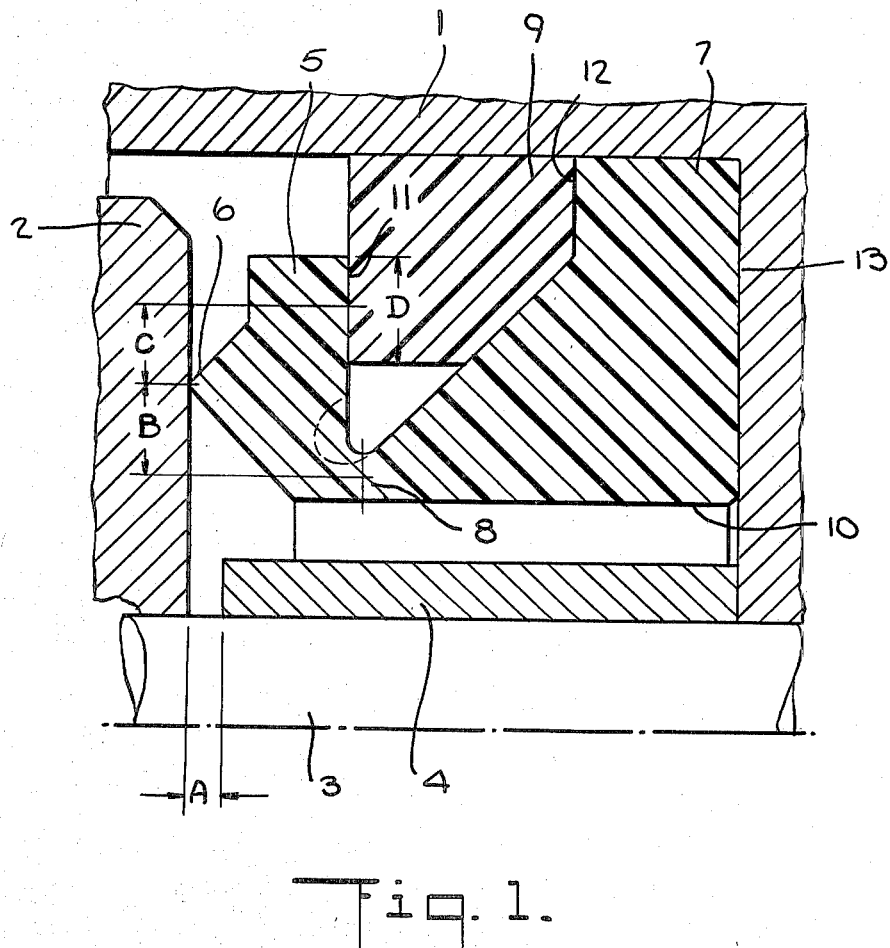
FIG. 1 is a schematic half sectional view of a preferred embodiment of a joint pin seal in accordance with the present invention.

In order to afford a complete understanding of the present invention and an appreciation of its advantages, a description of the preferred embodiments is presented below.

The support ring of the joint pin seal of the present invention is designed stiff and rugged. A membrane region of the support ring, acting like a joint, effectively prevents or minimizes the lip seal of the joint pin seal in accordance with the invention from shifting radially outward in the event of an axial or radial load. The contact zone between the sealing lip proper and the sealed-off counter-surface is limited for this reason to an extremely narrow zone which is not abandoned if the surface sealed is shifted axially. For this reason, penetration of dirt particles into the area of the critical sealing zone is substantially decreased in comparison with known prior art joint pin seals. Sufficient lubrication is ensured because oil is admitted to the interior.

The sealing lip is integrally formed from the elastomer material of the support ring and to this extent is resilient itself in a flexural elastic mode. The sealing lip is elastically supported in the radial direction. Specifically, the sealing lip is supported by the spring-elastic properties of the membrane portion of the support ring and by the spring-elastic properties of the pressure ring which is fabricated from an elastomer material which is selected to be softer than the material of the support ring. The pressure ring is stressed only in compression and not in flexure. For this reason, relaxation phenomena can exert no appreciable influence on the pressure of the sealing lip.

It is desirable to match the cross-section and the elasticity of the membrane to the corresponding properties and dimensions of the pressure ring in such a manner that the lip ring can be moved in the direction of the pressure ring when the sealing lip is stressed, without tilting motion. Absolute prevention of tilting motion, however, cannot yet be practically attained, particularly if the unavoidable occurrence of wear and aging phenomena are taken into consideration. However, it has been found that, in accordance with the present invention, the slight tilting motions apparently have no great practical disadvantages as long as it is assured that a radial shift of the sealing lip is substantially prevented with appropriate axial compression.

Preferred embodiments of the present invention are disclosed herein. Layouts and designs which are satisfactory can also be readily provided by one skilled in the art. One skilled in the art can determine satisfactory final adjustments for a particular design by a few tests, taking into consideration the material properties with which he is familiar.

According to one preferred embodiment of the present invention, the pressure ring rests in the bore of the housing with a circumferential surface extending in the axial direction. The desired relationship with the receiving housing bore, which should be unchangeable in the event of an axial displacement of the lip ring, is thereby aided effectively.

The pressure ring rests with a first end face or front face extending in the radial direction against a correspondingly flat rear wall of the lip ring. Tilting motion of the lip ring in the event of an axial displacement is thereby effectively counteracted. The minimization of tilting motion of the lip ring can be enhanced further if the pressure ring is simultaneously braced on the rear side by a second end face extending in the radial direction which rests against a mating face of the stiffening ring. The inner circumference of the pressure ring in the vicinity of the second or rear side end face may have the shape of a conical surface which rests against a correspondingly shaped conical surface of the support ring. If an axially directed force is exerted on the first end face of the pressure ring, an increased pressure on the outer circumference of the pressure ring is exerted by the wall of the receiving housing bore. This likewise contributes to a stabilization of the position of the front or first end face of the lip ring which extends in the radial direction.

To obtain such an effect, it is advantageous if the mutually opposite conical surfaces of the pressure ring and the stiffening ring include a cone angle of 60° to 120°. An angle of 80° to 90° is preferred.

Elastomer materials, i.e., elastic materials resembling rubber, per se have an extremely small compressibility. It is therefore necessary that, outside of the contact areas between the pressure ring and the support ring including the lip ring and the receiving housing bore, clear areas for the pressure ring be provided, into which areas the rubber-elastic material can give way if the pressure forces are increased. Area-wise, the percentage of these clear areas with respect to the entire area of the pressure ring should be 10 to 40% and preferably 25 to 35%.

The support ring, including the lip ring and the stiffening ring, is fabricated from a material substantially harder than the pressure ring material. It has been found advantageous for the support ring to be fabricated from an elastomer material, the Shore A hardness of which is 1.5 to 2.3 times greater than the hardness of the corresponding pressure ring. The choice of an appropriate ratio permits a particularly advantageous design of the cross sections of the individual parts. Dust and dirt components are effectively prevented from penetrating into undercuts and cavities by an appropriate combination.

The lip and support ring of the joint pin seal of the present invention are suitably fabricated from an elastomer material, the hardness of which is preferably 90 to 98 Shore A. The sealing lip therefore has a high wear resistance. Because of the great reduction of cross sectional area in the membrane region of the support ring and because of the support by the pressure ring fabricated from a soft-elastic material, the sealing lip of the lip ring is pressed against the sealing surface in a soft-elastic manner. Thus, damage to the sealing lip due to mechanical overload is largely suppressed. The useful life of the sealing lip is thereby increased substantially.

Referring to FIG. 1, the joint pin seal comprises a support ring of elastomer material comprising a stiffening ring 7 which is reduced in the central region by a circular notch in the outer circumference to form a membrane 8 which transitions into a lip ring 5. The lip ring 5 has an axially oriented circumferential sealing lip 6 which projects therefrom. The sealing lip 6 rests with a sharp sealing edge against the radially-extending sealing surface of a sealed-off machine part 2. The support ring is pressed firmly within the bore of housing 1 and rests against the radially disposed rear wall section 13 of the housing bore.

The lip ring, membrane and the stiffening ring are most advantageously designed as one piece and are most suitably fabricated from an elastomer material with a Shore A hardness of, for example, 94. The use of polyurethane materials has been found highly suitable for its fabrication.

Disposed in the notch between the stiffening ring 7 and the lip ring 5 is a pressure ring 9 which is fabricated from a soft elastomer material with a Shore A hardness of, for example, about 50. The pressure ring has a cylindrical outer circumference which rests directly against the cylindrical inside wall formed by the housing bore. The front face surface 11 of pressure ring rests against the back surface of the lip ring 5 which extends in the radial direction. The rear face surface 12 of the pressure ring 9 rest against the end face of the stiffening ring 7 facing the sealed off medium. The stiffening ring 7 end face is aligned radially in the region of its outer circumference, but then is tapered conically in the direction toward the sealed-off medium forming the notch region of the support ring which transitions into membrane 8. An axial load on the sealing lip 6 results, for this reason, in an increased pressure of the outer circumference of the pressure ring 9 against the receiving housing bore wall. Therefore, displacement of the sealing lip 6 outward in the radial direction is effectively counteracted.

The ratio of the average radial distance B of the membrane 8 from the sealing lip 6 to the radial distance C between the sealing lip 6 and the center line of the area of the pressure ring 9 in contact with the lip ring 5, the width of which is designated as D, is preferably about 0.7 to 1.4. In the example illustrated in FIG. 1, this ratio is 1.0. Upon a reduction of the axial distance A between the spacer sleeve 4 and the relatively movable sealed-off machine part 2, there results from this ratio and the mutual matching of dimensions of the adjacent elastic parts, a redisplacement of the lip ring 5 without measureable change of the diameter of the sealing lip 6 or a change of the angles on both sides between the flank surfaces of the sealing lip and the surface of the sealed-off machine part 2 extending in the radial direction. The inside wall 10 of the support ring is cylindrical and contributes substantially to the stabilization of the radial distance of the sealing lip 6 from the axis of rotation.

Although preferred embodiments of the present invention have been described in detail, it is contemplated that modifications may be made within the spirit and scope of the invention.

What is claimed is:

1. A joint pin seal for a caterpillar track for providing a seal with a relatively movable machine part that surrounds said joint pin and has a surface to be sealed which lies substantially in a plane defined by a radius from the axis of said joint pin, said seal comprising:

a housing adjacent said movable machine part having a bore for receiving said joint pin wherein said housing bore defines a substantially cylindrical inner housing wall and a housing rear wall section facing said movable machine part;

a support ring fabricated from a hard elastomer material comprising a stiffening ring and a lip ring with said support ring having a substantially constant inside diameter defining a substantially cylindrical inside wall and a variable outside diameter defining an outside wall; and said support ring is pressed firmly into said housing bore with said stiffening ring resting against said housing bore rear wall section and with said lip ring located adjacent said movable machine part surface to be sealed;

said lip ring extends radially outward and has formed on a surface facing said movable machine part surface to be sealed a circumferential sealing lip projecting toward and sealingly contacting said movable machine part surface to be sealed; and said support ring outside wall is tapered in a notch-like fashion from said stiffening ring into said lip ring forming a membrane at the transition into said lip ring thereby providing said support ring with a notch between said stiffening ring and said lip ring;

a pressure ring fabricated from a softer elastomer material disposed in said notch and having an outer circumferential wall surface in contact with said cylindrical inner housing wall, a front face surface in contact with said lip ring and a rear face surface in contact with said stiffening ring whereby said pressure ring presses said sealing lip against said movable machine part surface to be sealed;

wherein the ratio of the average radial spacing of said membrane from said sealing lip to the average radial distance from the center line of said pressure ring front face surface area in contact with said lip ring to said sealing lip is about 0.7 to 1.4; and wherein the dimensions and the elasticity of the support ring are matched to the corresponding values of the pressure ring in such a manner that the axial distance between the movable machine part surface to be sealed and the housing rear wall section can be reduced without appreciable radial displacement of the sealing lip.

2. A joint pin seal as recited in claim 1 wherein said pressure ring outer circumferential wall surface resting against said cylindrical inner housing wall extends in the axial direction.

3. A joint pin seal as recited in claim 1 or 2 wherein said pressure ring front face surface contacting said lip ring extends in the radial direction.

4. A joint pin seal as recited in claim 3 wherein said pressure ring rear face surface contacting said stiffening ring extends in the radial direction.

5. A joint pin seal as recited in claim 4 wherein a portion of said pressure ring rear face surface tapers into a conical surface which rests against a portion of said stiffening ring surface which is tapered to provide a mating conical surface.

6. A joint pin seal as recited in claim 5 wherein said mating conical surfaces of said pressure ring and said stiffening ring enclose a cone angle of about 60° to 120°.

7. A joint pin seal as recited in claim 6 wherein the Shore A hardness of the support ring material is 1.5 to 2.3 times greater than the hardness of the pressure ring material.

8. A joint pin seal as recited in claim 6 wherein said angle is about 80° to 90°.

* * * * *